United States Patent
Galletti et al.

(10) Patent No.: US 8,272,981 B2
(45) Date of Patent: Sep. 25, 2012

(54) PULLEY ASSEMBLY FOR A CONTINUOUSLY VARIABLE TRANSMISSION

(75) Inventors: Alessio Galletti, Soiana (IT); Paolo Seta, Ivrea (IT)

(73) Assignee: Dayco Europe S.r.L. Con Unico Socio, Chieti (IT)

(*) Notice: Subject to any disclaimer, the term of this patent is extended or adjusted under 35 U.S.C. 154(b) by 728 days.

(21) Appl. No.: 11/990,515

(22) PCT Filed: Aug. 18, 2005

(86) PCT No.: PCT/IT2005/000494
§ 371 (c)(1),
(2), (4) Date: Dec. 9, 2008

(87) PCT Pub. No.: WO2007/020665
PCT Pub. Date: Feb. 22, 2007

(65) Prior Publication Data
US 2009/0156338 A1  Jun. 18, 2009

(51) Int. Cl.
*F16H 59/00* (2006.01)
*F16H 61/00* (2006.01)
*F16H 63/00* (2006.01)

(52) U.S. Cl. .................. 474/19; 474/23; 474/8
(58) Field of Classification Search .......... 474/19, 474/21, 23, 17, 8, 46, 166
See application file for complete search history.

(56) References Cited

U.S. PATENT DOCUMENTS

| | | | | |
|---|---|---|---|---|
| 5,328,413 | A * | 7/1994 | Robert | 474/13 |
| 6,149,540 | A * | 11/2000 | Johnson et al. | 474/14 |
| 6,379,274 | B1 * | 4/2002 | Robert | 474/19 |
| 6,755,759 | B2 * | 6/2004 | Blanchard | 474/19 |
| 7,674,197 | B2 * | 3/2010 | Aitcin | 474/19 |
| 7,850,555 | B2 * | 12/2010 | Keane et al. | 474/19 |
| 7,901,308 | B2 * | 3/2011 | Binello et al. | 474/19 |
| 2002/0183145 | A1 * | 12/2002 | Blanchard | 474/19 |
| 2005/0209032 | A1 * | 9/2005 | Aitcin | 474/19 |
| 2007/0105671 | A1 * | 5/2007 | Binello et al. | 474/19 |

FOREIGN PATENT DOCUMENTS

WO    WO 2004094874 A1 *  11/2004

* cited by examiner

*Primary Examiner* — Michael Mansen
*Assistant Examiner* — Juan Campos, Jr.
(74) *Attorney, Agent, or Firm* — Davidson Berquist Jackson & Gowdey, LLP

(57) ABSTRACT

Pulley assembly for a continuously-variable vehicle transmission, comprising a support element having an axis, a first half-pulley rotationally connected to the support element, a second half-pulley facing the first half-pulley to define a seating adapted to house a drive belt, the second half-pulley being axially and circumferentially mobile in relation to the support element, and cam means functionally inserted between the second half-pulley and the support element to control the position of the second half-pulley. The cam means define a plurality of circumferential cavities carried by a peripheral portion of the second half-pulley, said cavities being defined by the first and second sides which are transverse to axis, and comprise a plurality of cam-followers which are connected to the support element and housed in the corresponding circumferential cavities to cooperate selectively with the first and second sides.

10 Claims, 2 Drawing Sheets

US 8,272,981 B2

PULLEY ASSEMBLY FOR A CONTINUOUSLY VARIABLE TRANSMISSION

TECHNICAL FIELD

This invention relates to a pulley assembly for a continuously variable transmission, particularly for use on three- or four-wheeled vehicles and snowmobiles.

BACKGROUND ART

A continuously variable transmission comprises a first pulley assembly connected to an internal combustion engine, namely the drive pulley assembly, a second pulley assembly connected to the wheels of the vehicle, namely the driven pulley assembly, and a belt wound between the two pulley assemblies.

Each assembly usually comprises a shaft connected to the motor and wheels, a support element driven by the shaft, and a pair of half-pulleys connected in a rotationally rigid way to the support and mobile in relation to one another along the swiveling support element to define the transmission ratio.

In one possible embodiment, the drive pulley assembly includes a clutch to couple the shaft selectively to the half-pulleys, and the driven pulley assembly is equipped with a cam device to control the relative axial position between the pulleys.

Pulley assemblies provided with cam devices generally include a swiveling sleeve adapted to drive the wheels of the vehicle, a fixed half-pulley connected rigidly to the sleeve, a half-pulley which is axially mobile on the sleeve and driven in rotation by the cam device, and a spring to push the mobile half-pulley towards the fixed half-pulley. In particular, the mobile half-pulley includes a hub supported radially on the sleeve via a bushing, and a conical wall connected coaxially to the hub and adapted to cooperate with the drive belt.

In known pulley assemblies, the cam device comprises a plurality of cams fitted to the sleeve which present a first and second profile converging on the mobile half-pulley, and a cam-follower portion carried by the hub of the mobile pulley which defines a plurality of circumferential cavities that house the corresponding cams with circumferential play. In particular, each cavity is defined laterally by two inclined sides which cooperate with the first or second profile respectively during a drive condition in which the engine drives the wheels, and during an engine-braking condition in which the wheels tend to drive the engine.

During the drive condition, the distance between the half-pulleys of the drive pulley assembly is varied in a way dependent on speed, for example using a centrifugal control device; when the number of revolutions increases, the half-pulleys move closer together, thus increasing the winding diameter. As a result of the action of the belt, the half-pulleys of the driven pulley assembly move apart, compressing the spring, and the mobile half-pulley retracts, performing a partial rotation defined by the cam-follower portion which slides on the first profile of the corresponding cams.

During the engine-braking condition, the sides of the cam-follower portion cooperate with the second profile, which is inclined so as to keep the half-pulleys of the driven pulley assembly close together in order to produce a transmission ratio that maximises the speed of the drive pulley assembly, and thus fully exploit the inertial braking action of the internal combustion engine.

However, in known cam pulley assemblies, problems occur in the transition between the drive condition and the engine-braking condition. In particular, during the initial moments of the engine-braking condition, the cam-follower portion and the mobile half-pulley tend to oscillate circumferentially due to the play between the cams and cavities, and impact alternately on the opposite contact surfaces. Said oscillations generate an undesirable driving feel and noise, which make the comfort of the vehicle worse.

DISCLOSURE OF INVENTION

The purpose of the present invention is to provide a pulley assembly with a cam device free of the drawbacks described above.

The purpose of this invention is achieved by means of a pulley assembly with a cam device as defined in claim 1.

BRIEF DESCRIPTION OF THE DRAWINGS

In order to explain the invention in greater detail, a preferred embodiment will now be described, by way of example but not of limitation, with reference to the annexed drawing wherein.

BEST MODE FOR CARRYING OUT THE INVENTION

Figure 1:
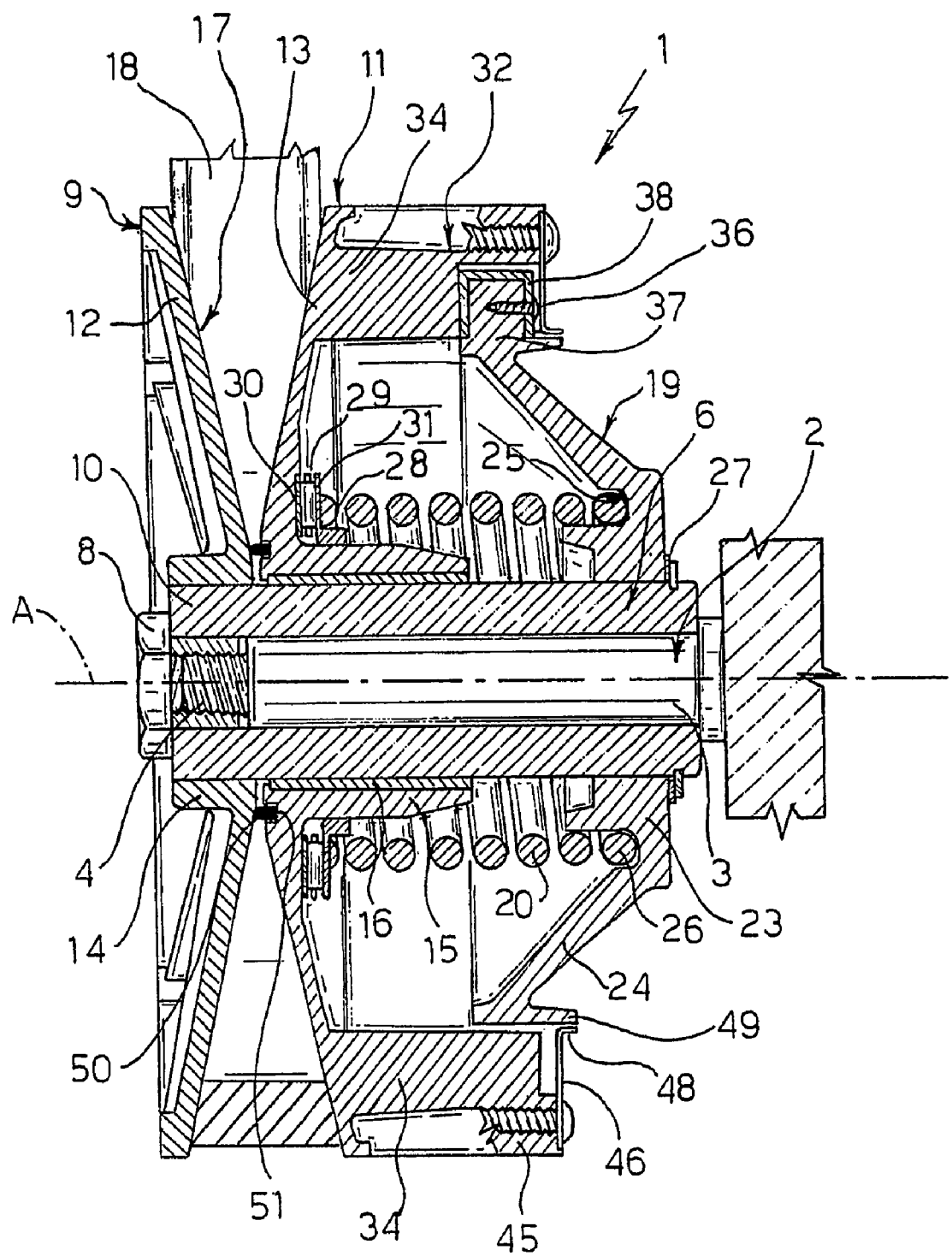
FIG. 1 is an axial cross-section of a pulley assembly according to the invention.

Assembly 1 comprises a connecting shaft 2 swiveling around an axis A and having an end portion 3 adapted to be rigidly connected to a transmission element to drive a vehicle and a threaded portion 4 opposite to the end portion 3, a sleeve 6 rigidly connected to the shaft 2 via a bolt 8 screwed to the threaded portion 4 and housing the connecting shaft 2, a fixed half-pulley 9 rigidly connected to an end portion 10 of the sleeve 6, and a mobile half-pulley 11 radially supported by the sleeve 6.

Fixed and mobile half-pulleys 9 and 11 comprise conical walls 12 and 13 respectively and hubs 14 and 15 respectively, the first of which is keyed to the sleeve 6 and the second of which slides and swivels on a coupling 16 supported radially by the sleeve 6.

Conical walls 12 and 13 face one another and define a V-shaped groove 17 for a belt 18 which connects the pulley assembly 1 to a drive pulley assembly (not illustrated), directly driven by an internal combustion engine of the vehicle.

The pulley assembly 1 also includes a cup-shaped support 19 rigidly connected to the sleeve 6 on an axial part opposite to the fixed half-pulley 9, and an axial spring 20 interposed between the cup-shaped support 19 and the mobile half-pulley 11.

In particular, the cup-shaped support 19 comprises a hub 23 keyed to the sleeve 6 and a conical wall 24 converging from the side of hub 23 opposite the half-pulleys 9 and 11, and also defines a seating 25 radially positioned between the hub 23 and the conical wall 24 to house an end portion 26 of the axial spring 20.

The axial spring 20 is pre-loaded to push the mobile half-pulley 11 towards the fixed half-pulley 9, and axially stresses the cup-shaped support 19 which axially abuts against an elastic ring 27 which is carried by sleeve 6 and cooperates with the hub 23.

On the side axially opposite to end portion 26, the axial spring 20 has an end portion 28 which pre-loads a thrust bearing 29 against the mobile half-pulley 11.

In particular, the thrust bearing 29 presents a fifth wheel 30 which abuts against the conical wall 13, and a fifth wheel 31 which abuts against the axial spring 20 and is radially supported by the hub 15.

Figure 2:
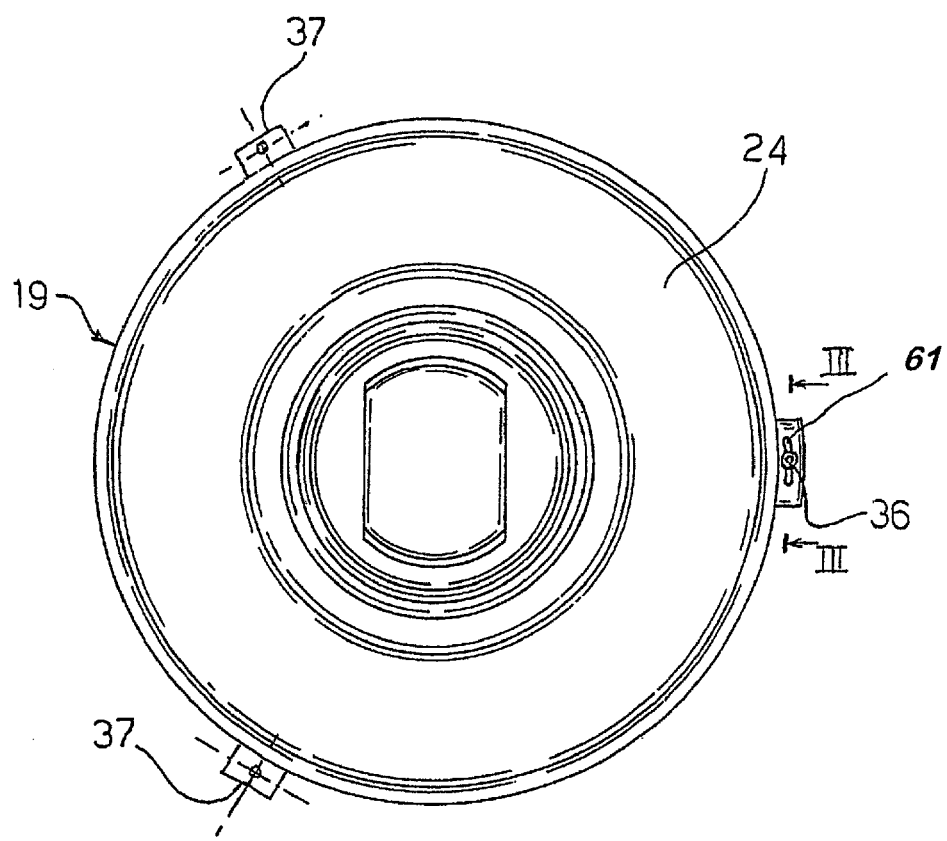
FIG. 2 is a right-hand side view of a detail of FIG. 1.

To regulate the axial position of the mobile half-pulley 11, allowing it to be driven, the pulley assembly 1 also includes a cam device 32 (FIGS. 2-3) which presents a plurality of axial cams 35 supported peripherally on the conical wall 24, and a cam-follower portion that defines a plurality of cavities 33, which are carried circumferentially by a peripheral portion 34 of the conical wall 13 and house the corresponding axial cams 35.

In particular, each axial cam 35 is connected via a screw 36 to a tooth 37 which exits radially from the conical wall 24 and comprises a cap 38 that defines a cavity 39 housing the tooth 37 and a shock-absorbing body 40, made of an elastomer material positioned inside the cavity 39 between the tooth 37 and the cap 38.

In particular, the cap 38 is made of polyamide, is preferably co-moulded onto the shock-absorbing body 40, and also defines a slot 61 that slidingly houses a shank of the screw 36. Each cap 38 is constrained in the radial direction via the screw 36 to counteract the centrifugal acceleration action, and is enabled by the slot 61 to traverse in the circumferential direction in relation to the screw 36.

The cavities 33 and the cams 35 are surrounded in the radial direction by an external cylindrical wall 45 which is coaxial with axis A and exits from the conical wall 13 on the side opposite the V-shaped groove 17. The external cylindrical wall 45 also supports a protective plate 46 inserted perpendicular to the axis A to close the teeth 35 on the side opposite the cavities 33.

The protective plate 46 also has a circular edge 48 which is bent parallel to the axis A and faces an edge 49 that exits from the conical wall 24 on the side opposite the mobile half-pulley 11 to define a labyrinth seal and prevent debris and impurities from being deposited in the cavities 33 and on the teeth 35.

The cap 38 also defines a first and a second contact surface 41, 42 which are transverse to the axis A and converge on the corresponding circumferential cavity 33 to cooperate with the corresponding sides 43, 44, which define each cavity 33 in the circumferential direction and converge on the fixed half-pulley 9.

The pulley assembly 1 is also provided with a ring 50 inserted in a seating 51 opposite the hub 14, defined on the hub 15 in a radially inner position with respect to the V-shaped groove 17. The ring 50 is made of an anti-friction material and projects axially from the hub 15, forming a spacer to prevent direct contact between the hub 14 and the hub 15.

The pulley assembly 1 operates as follows.

When the internal combustion engine is switched off or idles, the pulley assembly 1 is in a closed position wherein the axial spring 20 keeps the half-pulleys 9, 11 together, defining a maximum reduction ratio suitable for pick-up.

Figure 3:
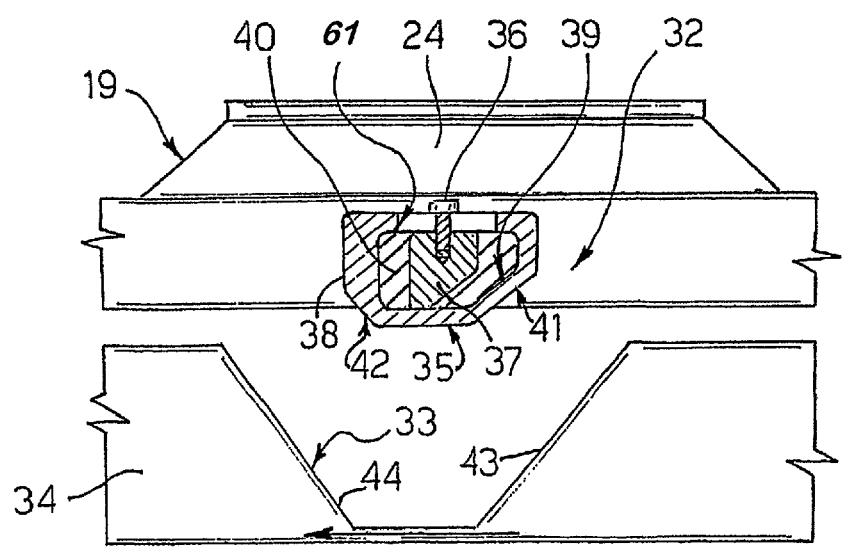
FIG. 3 is a cross-section along line III-III in FIG. 2. No. 1 in FIG. 1 indicates a pulley assembly for a continuously variable transmission.

During the drive condition, indicated by the arrow in FIG. 3, the pulley assembly 1 is driven as a result of the friction component generated by the thrust of the axial spring 20 and by cam device 32. In particular, the sides 43 of the cavities 33 are driven in abutment against the corresponding contact surfaces 41 and the shock-absorbing body 40 is deformed, allowing a substantially uniform distribution of the contact forces on each axial cam 35.

The resultant of the contact forces between the caps 38 and the sides 43 has an axial component which acts on the mobile half-pulley 11 and is directed towards the fixed half-pulley 9 to compress the belt 18. The resultant of the contact forces also has a circumferential component which acts on the cup-shaped support 19, driving the connecting shaft 2.

Following a variation in the transmission ratio due, for example, to acceleration, the winding diameter around the drive pulley assembly increases and the winding diameter around the driven pulley assembly decreases. Consequently, the mobile half-pulley 11 retracts against the action of the spring 20 and performs a partial rotation guided by the side 43.

In the engine-braking condition, the engine torque is inverted and transmitted by the connecting shaft 2, which tends to accelerate compared with the belt 18. In this case, the fixed half-pulley 9 remains rigidly connected with the sleeve 6, and the mobile half-pulley 11 tends to follow the belt 18 and slow down. The contact surface 41 thus separates from the side 43, and on the opposite side, side 44 abuts against the contact surface 42, causing an impact which is absorbed by the shock-absorbing body 40.

In particular, the circumferential distance which separates the sides 43, 44 of a cavity 33 and the width of the axial cams 35 are the same as those normally used when the cam means 32 are made with a reduced radius on the hub of the half-pulley. In this way, the circumferential play between the axial cams 35 and the cavities 33 remains unchanged, but as it is positioned at a peripheral radial level, the angular movement traveled by the mobile pulley 11 without coming into contact with one of the sides 43, 44 during the transition from the forward drive condition to the engine-braking condition is reduced.

The advantages of the present pulley assembly 1 are as follows.

The design of the cam means 32 with a peripheral diameter reduces the time for which the axial cams 35 and the sides 43, 44 are separated, thus improving the driving feel, particularly during transient states between the forward drive condition and the engine-braking condition.

Moreover, the presence of shock-absorbing bodies 40 dissipates the energy of the impacts between the axial cams 35 and the sides 43, 44, thus increasing the quietness of the transmission during transient states.

During the driving condition, the shock-absorbing bodies 40 better distribute the contact pressures, and increase the life of the axial cams 35.

Finally, any modifications and variations which may be made to the pulley assembly 1 described and illustrated here would obviously still fall within the scope of this invention, as defined in the attached claims.

In particular, the pulley assembly 1 could be provided with a clutch to selectively connect the shaft 2 to the sleeve 6. A shock-absorbing layer could also be laid on the sides 43, 44.

The invention claimed is:

1. A driven pulley assembly for a continuously-variable vehicle transmission, comprising a support element having an axis, a first half-pulley rigidly connected to said support element, a second half-pulley facing said first half-pulley to define a seating adapted to house a drive belt, said second half-pulley being axially and circumferentially mobile in relation to said support element, a cam assembly functionally inserted between a radial peripheral portion of said second half-pulley and a radial peripheral portion of said support element to control the position of said second half-pulley, said cam assembly defining a plurality of circumferential cavities carried by the radial peripheral portion of said second half-pulley and respectively defined by first and second sides disposed crosswise to said axis that act as cam-followers, and further comprising a plurality of cams each of which has a base portion connected to said support element and housed in a corresponding one of the plurality of circumferential cavities wherein each of said cams cooperates selectively with said first and second sides, said first and second sides defining a respective contact surface for a relative portion of each of the plurality of cams and converging towards said first half pulley, and each of said plurality of cams further including deformable shock-absorbing material mounted over said base portion so as to be positioned within the plurality of circumferential cavities to attenuate impacts in the circumferential direction with the deformable shock absorbing material being interposed with circumferential play between two stops defined by the first and second sides, respectively, thereby delimiting the maximum relative motion along the circumferential direction between the first and second half-pulleys.

2. The pulley assembly as claimed in claim 1, further including an elastic element which cooperates axially with said second half-pulley to push said second half-pulley towards said first half-pulley.

3. The pulley assembly as claimed in claim 2, further including a thrust bearing inserted between said elastic element and said second half-pulley.

4. The pulley assembly according to claim 2, further including a cup-shaped support, which supports said cams, rigidly connected to said support element, and cooperating with said elastic element.

5. The pulley assembly as claimed in claim 2, wherein the cam is positioned outwardly of said elastic element.

6. The pulley assembly as in claim 2, wherein the elastic element is a spring.

7. The pulley assembly as claimed in claim 1, further including a spacer ring which is fitted to one of said first and second half-pulleys, housed in a seating facing the other of said first and second half-pulleys and positioned so that the spacer ring is radially inside said seating.

8. A driven pulley assembly for a continuously-variable vehicle transmission, comprising:
   a support element having an axis,
   a first half-pulley rigidly connected to said support element,
   a second half-pulley facing said first half-pulley to define a seat adapted to house a drive belt, said second half-pulley being axially and circumferentially mobile in relation to said support element,
   a cam assembly functionally inserted between a radial peripheral portion of said second half-pulley and a radial peripheral portion of said support element to control the position of said second half-pulley, said cam assembly defining a plurality of circumferential cavities carried by the radial peripheral portion of said second half-pulley and respectively defined by first and second sides disposed crosswise to said axis that act as cam-followers, and comprising a plurality of cams each of which is connected to said support element and housed in a corresponding one of the plurality of circumferential cavities,
   wherein each of said cams cooperates selectively with said first and second sides, said first and second sides defining a respective contact surface for the relative cams, and
   further including deformable shock-absorbing material within the plurality of circumferential cavities that cooperates with said cam assembly to attenuate impacts in the circumferential direction with the deformable shock absorbing material being interposed with circumferential play between two stops defined by the first and second sides, respectively, thereby delimiting the maximum relative motion along the circumferential direction between the first and second half-pulleys,
   wherein said deformable shock-absorbing material is carried by said cams and that said cams are mobile with respect to said support element, and
   wherein each of said cams further include a cap that defines an internal cavity which houses a tooth integral with said cup-shaped support and a body made of the deformable shock-absorbing material interposed between said tooth and said cap, at least in the circumferential direction inside said internal cavity.

9. The pulley assembly as claimed in claim 8, wherein said cap defines a circumferential slot which houses a pin element rigidly connected to said tooth.

10. The pulley assembly according to claim 8, wherein said deformable shock-absorbing material comprises an elastomer material.

* * * * *